United States Patent
Zhou et al.

(10) Patent No.: US 9,772,924 B2
(45) Date of Patent: Sep. 26, 2017

(54) METHOD AND APPARATUS FOR FINDING BUGS IN COMPUTER PROGRAM CODES

(71) Applicant: Tencent Technology (Shenzhen) Company Limited, Shenzhen (CN)

(72) Inventors: Feihu Zhou, Shenzhen (CN); Liqiang Xie, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 53 days.

(21) Appl. No.: 15/182,463

(22) Filed: Jun. 14, 2016

(65) Prior Publication Data

US 2016/0350202 A1 Dec. 1, 2016

Related U.S. Application Data

(63) Continuation of application No. PCT/CN2014/092951, filed on Dec. 3, 2014.

(30) Foreign Application Priority Data

Dec. 19, 2013 (CN) .......................... 2013 1 0704156

(51) Int. Cl.
*G06F 9/44* (2006.01)
*G06F 11/36* (2006.01)

(52) U.S. Cl.
CPC ........ *G06F 11/362* (2013.01); *G06F 11/3636* (2013.01); *G06F 11/3648* (2013.01); *G06F 11/3664* (2013.01)

(58) Field of Classification Search
CPC .... G06F 11/36; G06F 11/362; G06F 11/3636; G06F 11/3648; G06F 11/3664
See application file for complete search history.

(56) References Cited

U.S. PATENT DOCUMENTS 5,533,192 A * 7/1996 Hawley ................. G06F 11/362
714/28
5,682,492 A * 10/1997 McFarland ......... G06F 9/30003
712/214

(Continued)

FOREIGN PATENT DOCUMENTS

CN 1776644 A 5/2006
CN 102073587 A 5/2011

OTHER PUBLICATIONS

Omar Ahmad et al., "Hierarchical, concurrent state machines for behavior modeling and scenario control", [Online], IEEE 1994, pp. 36-42, [Retrieved from Internet on Feb. 28, 2017], <http://ieeexplore.ieee.org/stamp/stamp.jsp?arnumber=390503>.*

(Continued)

*Primary Examiner* — Ziaul A Chowdhury
(74) *Attorney, Agent, or Firm* — Morgan, Lewis & Bockius LLP

(57) ABSTRACT

A method for debugging program code is performed at an apparatus having one or more processors and memory for storing programs to be executed by the one or more processors. The method includes the following steps: for each program code segment from a set of program code segments, assigning a unique value to a detection variable of a state machine when the respective program code segment operates the state machine. The unique value is based on a value of an identification variable associated with the respective program code segment. The method also includes determining a current value of the detection variable corresponding to an abnormal program exit, and determining a suspicious program code segment based on a comparison of the current value of the detection variable with the unique values of the respective identification variables. The method further (Continued)

includes outputting debug information based on the suspicious program code segment.

16 Claims, 8 Drawing Sheets

(56) References Cited

U.S. PATENT DOCUMENTS

| | | | | |
|---|---|---|---|---|
| 5,978,902 | A * | 11/1999 | Mann | G06F 11/348 712/227 |
| 6,189,140 | B1 * | 2/2001 | Madduri | G06F 11/348 712/227 |
| 6,311,327 | B1 * | 10/2001 | O'Brien | G06F 11/3466 714/35 |
| 6,317,638 | B1 * | 11/2001 | Schreder | G05B 19/042 700/2 |
| 7,627,785 | B1 * | 12/2009 | Grodnik | G06F 11/3636 714/38.14 |
| 2005/0172168 | A1 * | 8/2005 | Kilian | G06F 11/362 714/31 |
| 2005/0251794 | A1 * | 11/2005 | Taylor | G06F 11/3664 717/148 |
| 2010/0162212 | A1 * | 6/2010 | Stall | G06F 11/3664 717/124 |
| 2012/0017119 | A1 | 1/2012 | Ghosh et al. | |
| 2012/0084756 | A1 * | 4/2012 | Subramanian | G06F 11/3676 717/124 |
| 2012/0124588 | A1 * | 5/2012 | Sinha | G06F 9/54 718/102 |
| 2012/0167161 | A1 * | 6/2012 | Kim | H04L 63/1408 726/1 |
| 2013/0239214 | A1 * | 9/2013 | Klein | G06F 21/566 726/24 |
| 2014/0053027 | A1 * | 2/2014 | Nixon | G06F 11/3656 714/45 |
| 2014/0115566 | A1 * | 4/2014 | Cao | G06F 9/444 717/129 |
| 2014/0282414 | A1 * | 9/2014 | Chazan | G06F 11/3664 717/125 |
| 2016/0026581 | A1 * | 1/2016 | Muttik | G06F 12/1441 726/26 |

OTHER PUBLICATIONS

Bart Vermeulen, "Functional Debug Techniques for Embedded Systems", IEEE 2008, pp. 208-2015, [Retrieved from Internet on Feb. 28, 2017], <http://ieeexplore.ieee.org/stamp/stamp.jsp?arnumber=4534159>.*

Richard K. Shehady et al., "A Method to Automate User Interface Testing Using Variable Finite State Machines", [Online], IEEE 1997, pp. 80-88, [Retrieved from Internet on Feb. 28, 2017], <http://ieeexplore.ieee.org/stamp/stamp.jsp?arnumber=614080>.*

Yanmei Li et al., "Data Flow Analysis and Formal Method", [Online], 2015, pp. 398-406, [Retrieved from Interent on Feb. 28, 2017], <http://download.springer.com/static/pdf/782/chp%253A10.1007%252F978-3-662-46248-5_48.pdf>.*

Tencent Technology, ISRWO, PCT/CN2014/092951, Feb. 17, 2015, 7 pgs.

Tencent Technology, IPRP, PCT/CN2014/092951, Jun. 21, 2016, 5 pgs.

* cited by examiner

METHOD AND APPARATUS FOR FINDING BUGS IN COMPUTER PROGRAM CODES

PRIORITY CLAIM AND RELATED APPLICATION

This application is a continuation application of PCT Patent Application No. PCT/CN2014/092951, entitled "METHOD AND APPARATUS FOR FINDING BUGS IN COMPUTER PROGRAM CODES" filed on Dec. 3, 2014, which claims priority to Chinese Patent Application Serial No. 201310704156.3, entitled "METHOD AND APPARATUS FOR FINDING BUGS IN COMPUTER PROGRAM CODES", filed on Dec. 19, 2013, both of which are incorporated herein by reference in their entirety.

FIELD OF THE APPLICATION

The present application generally relates to the field of computer technologies, and more particularly to a method and apparatus for finding bugs in program code.

BACKGROUND

Debugging program code is an important subject for the field of computer technologies. Some known methods for debugging program code use GNU project debugger (GDB) tools to check core files, and then find bugs based on location information of suspicious program code and associated variable values that are recorded in the core files. Such known debugging methods, however, might be inefficient or ineffective if checking core files fails to disclose any location information of potential bugs.

Therefore, a need exists for a method and apparatus that can efficiently and accurately find bugs in program code.

SUMMARY

The above deficiencies associated with the known debugging methods may be addressed by the techniques described herein.

In some embodiments, a method for finding bugs in program code is disclosed. The method is performed at an apparatus, which has one or more processors and memory for storing programs to be executed by the one or more processors. The method includes, for each program code segment from a set of program code segments, assigning a unique value to a detection variable of a state machine in a process of the respective program code segment operating the state machine. In some instances, for example, the value of the identification variable associated with the respective program code segment is a current value of the identification variable determined in the process of the respective program code segment operating the state machine.

The unique value is assigned based on a value of an identification variable associated with the respective program code segment. In some instances, for example, the unique value assigned to the detection variable of the state machine in the process of the respective program code segment operating the state machine is identical to the value of the identification variable associated with the respective program code segment. In some other instances, for example, the unique value assigned to the detection variable of the state machine is determined by a predefined function that takes the value of the identification variable associated with the respective program code segment as an input. Additionally, in some instances, the unique value is assigned to the detection variable using an assignment statement for the detection variable in the respective program code segment.

The method includes determining a current value of the detection variable corresponding to an abnormal program exit during a process of the set of program code segments operating at least one state machine. In some instances, to determine the current value of the detection variable, the method includes retrieving a context associated with the at least one state machine when the abnormal program exit occurs, and determining the current value of the detection variable based on the retrieved context. In some instances, to retrieve the context, the method includes retrieving a core file generated in response to the abnormal program exit, and parsing the core file to determine the context associated with the at least one state machine when the abnormal program exit occurs.

The method also includes determining a suspicious program code segment from the set of program code segments based on a comparison of the current value of the detection variable with the unique values of the respective identification variables associated with the plurality of program code segments. In some instances, the method includes determining the suspicious program code segment based on a determination that the current value of the detection variable was assigned to the detection variable based on the value of the identification variable associated with the suspicious program code segment.

The method further includes outputting debug information for the abnormal program exit, where the debug information includes information of at least one statement in the suspicious program code segment. In some instances, the debug information includes location information of an assignment statement for the detection variable in the suspicious program code segment. Such location information can include, for example, at least one of a line number associated with the assignment statement, a name of a function that includes the assignment statement, and a file name of a source file that includes the assignment statement.

In some embodiments, an apparatus includes one or more processors and memory storing one or more programs for execution by the one or more processors. The one or more programs include instructions that cause the apparatus to perform the method for finding bugs in program code as described above. In some embodiments, a non-transitory computer readable storage medium stores one or more programs including instructions for execution by one or more processors. The instructions, when executed by the one or more processors, cause the processors to perform the method for finding bugs in program code at an apparatus as described above.

Various advantages of the present application are apparent in light of the descriptions below.

BRIEF DESCRIPTION OF DRAWINGS

The aforementioned implementation of the application as well as additional implementations will be more clearly understood as a result of the following detailed description of the various aspects of the application when taken in conjunction with the drawings.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
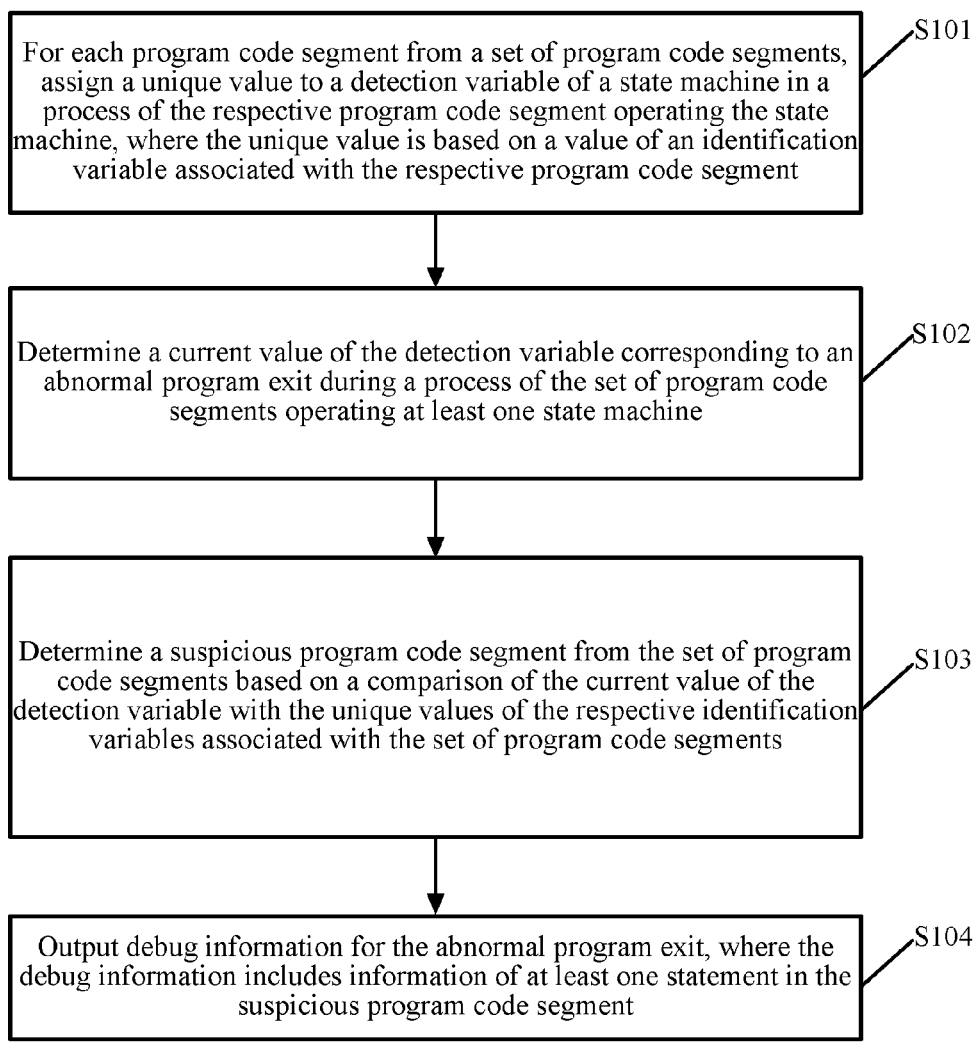
FIG. 1 is a flow chart illustrating a method performed at an apparatus for finding bugs in program code in accordance with some embodiments.

FIG. 1 is a flow chart illustrating a method performed at an apparatus for finding bugs in program code in accordance with some embodiments. The apparatus performing the method 100 can be any type of apparatus, device, tool and/or machine that can be used for debugging program code. Such an apparatus can be operatively coupled to, attached to, or included in (e.g., as a part of) a machine (e.g., a computer or any other type of electronic device) that executes the program code. The program code (potentially) debugged by the apparatus can be any type of program code that is executable by a machine (e.g., a computer or any other type of electronic device). Such program code can be written and/or complied in any program language such as, for example, assembly languages, BASIC, C, C++, C#, Cython, F#, Fortran, Java, JavaScript, Maple, Mathematica, MATLAB, Objective-C, Perk PHP, Python, Visual Basic, and/or the like.

In some embodiments, the apparatus performing the method 100 can be, for example, a smart phone, a mobile Internet device (MID), a personal digital assistant (PDA), a tablet computer, a laptop computer, a handheld computer, a desktop computer, a workstation, a server, and/or any other electronic device that can be used for debugging program code. In some embodiments, the apparatus can be a portion, a module or a component of a device (e.g., the devices listed above). In such embodiments, the apparatus can include, for example, a hardware-based module (e.g., a digital signal processor (DSP), an application-specific integrated circuit (ASIC), a field programmable gate array (FPGA), etc.), a software-based module (e.g., a module of computer code executed at a processor, a set of processor-readable instructions executed at a processor, etc.), or a combination of hardware and software modules. Instructions or code of such an apparatus can be stored in a memory of a device (i.e., the device that hosts the apparatus) and executed at a processor (e.g., CPU) of the device. In some embodiments, the apparatus can include one or more debugger tools such as, for example, GNU Debugger (GDB), Intel Debugger, LLDB, Microsoft Visual Studio Debugger, Valgrind, WinDbg, Eclipse, etc.

In operation, the apparatus can be operated by a user to debug program code. Such a user can be, for example, a program debugger, a program developer, a software engineer, a system administrator, etc. In some embodiments, the user can operate the apparatus to manually perform operations of a debugging method (e.g., as shown and described with respect to FIGS. 1-5) in a step-by-step manner. In some other embodiments, the user can send an instruction to the apparatus such that the apparatus is triggered to automatically perform operations of a debugging method.

In some embodiments, the apparatus performing the method 100 can include one or more processors and memory. In such embodiments, the method 100 is (at least partially) governed by instructions or code of an application that are stored in a non-transitory computer readable storage medium of the apparatus and executed by the one or more processors of the apparatus. The application is associated with finding bugs in program code. Such an application can be stored in a memory of the apparatus (e.g., the non-transitory computer readable storage medium of the apparatus) and executed at a processor of the apparatus. As shown in FIG. 1, the method 100 includes the following steps.

At S101, for each program code segment from a set of program code segments, the apparatus assigns a unique value to a detection variable of a state machine in a process of the respective program code segment operating the state machine, where the unique value is based on a value of an identification variable associated with the respective program code segment.

In some embodiments, a program code segment is in a process of operating a state machine after the program code segment performs a cut-in operation on the state machine and before the program code segment performs a cut-out operation on the state machine. In other words, after the program code segment initiates a cut-in operation on the state machine, the program code segment enters a process of operating the state machine. Such a process continues while the program code segment performs the cut-in operation, the cut-out operation and/or other operations (e.g., assignment operation) on the state machine, until the program code segment completes the cut-out operation on the state machine.

In some embodiments, the apparatus assigns a value of an identification variable associated with a respective program code segment, as the unique value, to the detection variable of a respective state machine. The respective state machine is the state machine operated by the respective program code segment from the set of program code segments when the assignment is performed. Such an assignment method is shown and described with respect to FIGS. 2A and 4.

In some other embodiments, the apparatus assigns a value calculated based on the value of the identification variable associated with the respective program code segment, as the unique value, to the detection variable of the respective state machine. Such an assignment method is shown and described with respect to FIGS. 3 and 5. In such embodiments, for example, the unique value assigned to the detection variable can be determined by a predefined function that takes the value of the identification variable associated with the respective program code segment as an input. For example, such a predefined function can include adding a predefined value to and/or subtracting a predefined value from the value of the identification variable. For another example, such a predefined function can include multiplying and/or dividing the value of the identification variable by a predefined value. In such embodiments, the predefined function can be any mathematical and/or logical function where the value of the identification variable can be uniquely determined from the result of the function by a reverse calculation.

In some embodiments, values of the identification variables associated with different program code segments are different from each other. That is, an identification variable associated with a program code segment from the set of program code segments has a value different from that of an identification variable associated with another program code segment from the set of program code segments. Similarly, the results calculated by the predefined function that takes the values of the identification variables associated with different program code segments as inputs are different from each other for the corresponding different program code segments. As a result, the values assigned to the detection variable in the processes of the different program code segments operating one or more state machines are different for the different program code segments (corresponding to the different processes). In other words, each value assigned to the detection variable in a respective process is a unique value associated with a respective program code segment that operates a state machine in that process.

In some embodiments, a program code segment represents a minimum code granularity that includes code (or instructions) for operating at least a cut-in operation and a cut-out operation on a state machine. Such a program code segment can include multiple (e.g., several, tens of, hundreds of, thousands of, tens of thousands of, etc.) program code subsegments. In some embodiments, a program code can be arbitrary divided into multiple program code segments in any suitable method. In some embodiments, a state machine represents an object model that can transfer between a finite number of internal states when being driven by certain external events such as, for example, being operated by a program code segment.

At S102, the apparatus determines a current value of the detection variable corresponding to an abnormal program exit during a process of the set of program code segments operating at least one state machine. In some embodiments, to determine the current value of the detection variable, the apparatus retrieves a context associated with a state machine when the abnormal program exit occurs, and then determines the current value of the detection variable based on the retrieved context. In some embodiments, an abnormal program exit refers to an event that a program code (including one or multiple program code segments) is not executed in accordance with a predefined process as programmed and/or is terminated in an abnormal manner.

In some embodiments, the state machines operated by the various program code segments from the set of program code segments can be the same state machine, different state machines, or partially-different state machines. The values of the identification variables associated with different program code segments can be different. As a result, the values assigned to the detection variable are different for different processes. In other words, the values assigned to the detection variable are different at different times (i.e., corresponding to different processes). Thus, the current value of the detection variable can be used to determine which program code segment is operating a state machine when that abnormal program exit occurs. Specifically, if the current value of the detection variable is assigned based on (e.g., identical to, calculated using the predefined function of) a value of an identification variable associated with a program code segment (i.e., when that program code segment operates a respective state machine), then that program code segment is a suspicious program code segment that operates the respective state machine when the abnormal program exit occurs.

In some embodiments, to determine a current value of the detection variable corresponding to an abnormal program exit, the apparatus can first retrieve a core file generated in response to the abnormal program exit. The apparatus can then parse the core file to determine a context associated with the respective state machine when the abnormal program exit occurs. The apparatus can further determine the current value of the detection variable based on the context. Such a method is shown and described with respect to FIGS. 2A-5.

At S103, the apparatus determines a suspicious program code segment from the set of program code segments based on a comparison of the current value of the detection variable with the unique values of the respective identification variables associated with the set of program code segments. As discussed above, by performing the comparison, the apparatus can determine the suspicious program code segment based on a determination that the current value of the detection variable was assigned to the detection variable based on the value of the identification variable associated with the suspicious program code segment. For example, by comparing the current value of the detection variable with the values of the respective identification variables associated with the set of program code segments, the apparatus can determine that the current value of the detection variable was identical to the value of the identification variable associated with the suspicious program code segment, or the current value of the detection variable was calculated using the predefined function that takes the value of the identification variable associated with the suspicious program code segment as an input.

In some embodiments, in order to perform the comparison, the apparatus is configured to store a set of values of identification variables, where each value from the set of values is associated with a respective program code segment from the set of program code segments. In such embodiments, the apparatus can store the set of values of identification variables in, for example, a database within the apparatus or at an external storage device accessible to the apparatus. In performing operations of S103, the apparatus retrieves values of identification variables from the database, and then compares the current value of the detection variable with the retrieved values of identification variables.

In some embodiments, to perform the comparison and determine the suspicious program code segment, the apparatus can output (e.g., print) values of all identification variables associated with each program code segment from the set of program code segments. The apparatus can then search through the output values of all identification variables to capture the one that is identical to the current value of the detection variable. The program code segment associated with the captured value of the respective identification variable is the suspicious program code segment. Alternatively, the apparatus can output (e.g., print) all the results calculated by the predefined function that takes, as inputs, the values of the identification variables associated with each program code segment from the set of program code segments. The apparatus can then search through the calculated results to capture the one that is identical to the current value of the detection variable. The program code segment associated with the captured calculated result is the suspicious program code segment.

At S104, the apparatus outputs debug information for the abnormal program exit, where the debug information includes information of at least one statement in the suspicious program code segment. In some embodiments, the debug information includes location information of an assignment statement for the detection variable or other statement in the suspicious program code segment. In some embodiments, the location information includes, for example, a line number associated with the assignment statement or another statement included in the suspicious program code segment, a name of a function that includes the assignment statement or another statement included in the suspicious program code segment, a file name of a source file that includes the assignment statement or another statement included in the suspicious program code segment, and/or the like. In some embodiments, the location information can include any other information useful for locating the potential bug in the program code.

In some embodiments, after determining the debug information (e.g., including the location information) associated with a potential bug, the apparatus can store the current value of the detection variable and the debug information in a data structure such as, for example, a list. Such a list can use a variable name of the detection variable as a key. In such embodiments, the apparatus can efficiently and quickly retrieve the stored current value of the detection variable and/or the debug information from the data structure by using the variable name of the detection variable as a search key.

In some embodiments, the apparatus can assign the unique value (determined based on the value of the identification variable associated with the respective program code segment) to the detection variable by invoking an assignment statement for the detection variable in a respective program code segment. In such embodiments, each of one or more program code segments from the set of program code segments can include such an assignment statement for the detection variable. The apparatus can invoke the assignment statement included in a program code segment during the process of that program code segment operating a respective state machine.

In some other embodiments, the apparatus can assign the unique value (determined based on the value of the identification variable associated with the respective program code segment) to the detection variable by invoking an assignment statement for the detection variable in a third-party tool or a code-debugging tool such as, for example, GDB. In such embodiments, in the process of each program code segment operating a respective state machine, the apparatus activates the third-party tool or code-debugging tool to invoke the assignment statement for performing the assigning operation.

In performing the method 100, the apparatus assigns various unique values to the detection variable of a respective state machine corresponding to each process of a respective program code segment operating that state machine. By performing such assigning operations, the apparatus attaches a unique tracking mark of a respective program code segment to a respective state machine (via the unique value of the detection variable associated with the respective state machine). By retrieving and analyzing the context corresponding to an abnormal program exit, the apparatus can determine the state machine that is operated when the abnormal program exit occurs. Meanwhile, the apparatus can also determine the current value of the detection variable of that state machine. As described above, each possible current value of a detection variable can be uniquely mapped (i.e., based on a one-to-one mapping) to a value of an identification variable associated with a respective program code segment. Thus, the apparatus can determine the respective program code segment, as a suspicious program code segment, based on the current value of the detection variable. As a result, the apparatus can obtain location information of a potential bug that is presumably included in the suspicious program code.

Figure 2A:
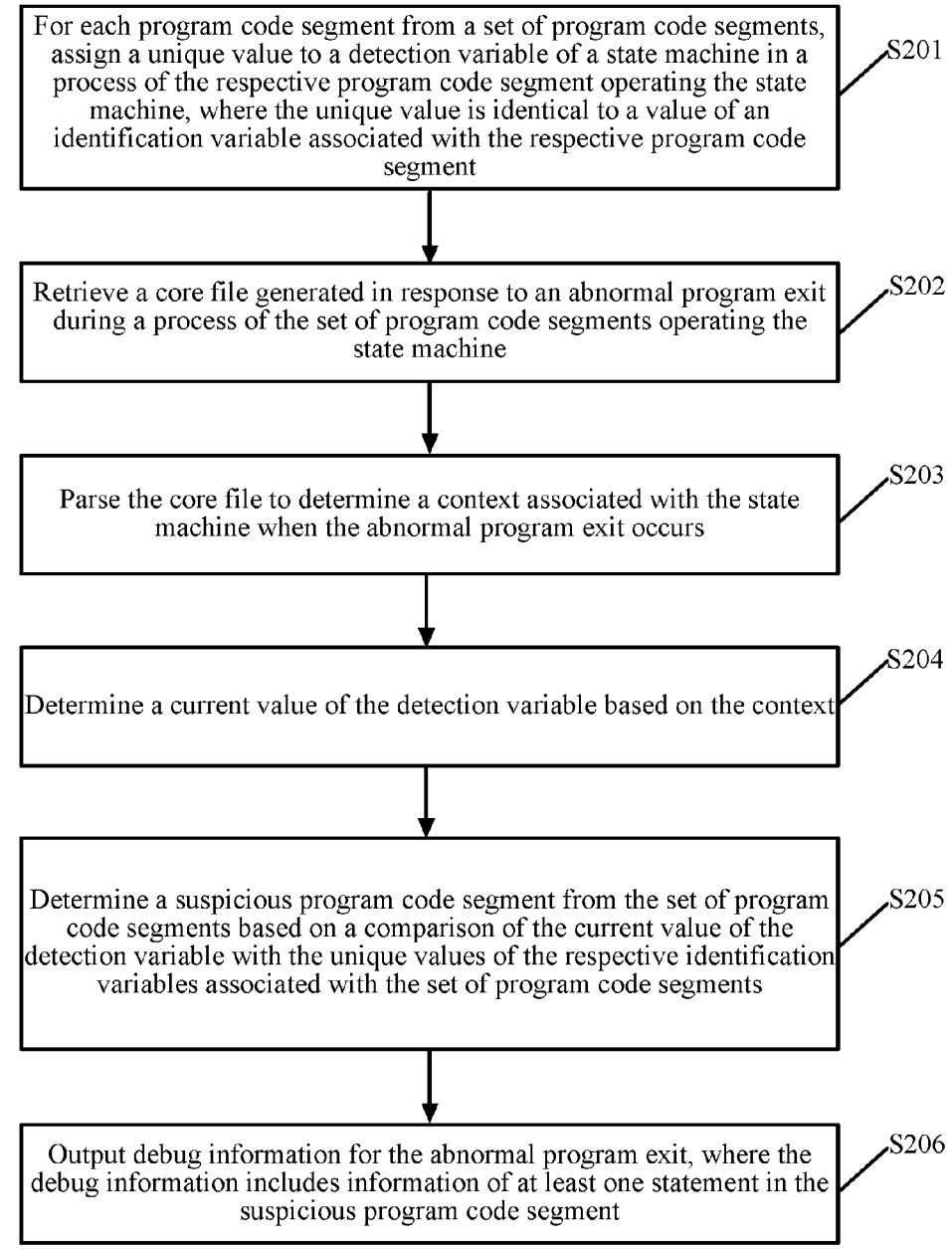
FIG. 2A is a flow chart illustrating another method performed at an apparatus for finding bugs in program code in accordance with some embodiments.

FIG. 2A is a flow chart illustrating another method 200 performed at an apparatus for finding bugs in program code in accordance with some embodiments. The apparatus performing the method 200 can be structurally and functionally similar to the apparatus performing the method 100 described above with respect to FIG. 1. Particularly, the program code debugged by the apparatus includes a set of program code segments. The apparatus is configured to assign a unique value to a detection variable of a state machine while a respective program code segment from the set of program code segments is operating that state machine. In some embodiments, each program code segment from the set of program code segments is operating the same state machine. In such embodiments, a detection variable of that state machine is assigned different values by the apparatus when a respective program code segments is operating that state machine.

Figure 2B:
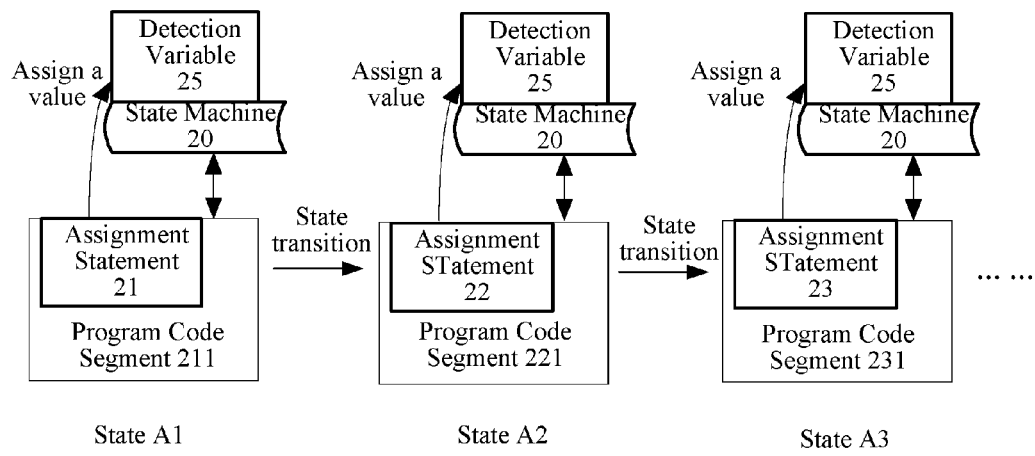
FIG. 2B is a schematic diagram illustrating the method in FIG. 2A.

FIG. 2B is a schematic diagram illustrating the method 200 in FIG. 2A. As shown in FIG. 2B, each of program code segments 211, 221 and 231 operates the same state machine 20, which is associated with a detection variable 25. Thus, when the program code segment 211 operates the state machine 20 at a first stage, the state machine 20 is in a state A1, and the apparatus assigns a value to the detection variable 25 using an assignment statement 21 included in the program code segment 211. Similarly, when the program code segment 221 operates the state machine 20 at a second stage, the state machine 20 is in a state A2, and the apparatus assigns a value to the detection variable 25 using an assignment statement 22 included in the program code segment 221. Furthermore, when the program code segment 231 operates the state machine 20 at a third stage, the state machine 20 is in a state A3, and the apparatus assigns a value to the detection variable 25 using an assignment statement 23 included in the program code segment 231. Since the states A1, A2 and A3 are different from each other, the values assigned to the detection variable in the three stages are different from each other. Thus, the apparatus can determine which stage the stage machine is in (corresponding to a program code segment from the three program code segments) based on a current value of the detection variable when an abnormal program exist occurs.

Similar to the apparatus performing the method 100, the apparatus performing the method 200 can include one or more processors and memory. In such embodiments, the method 200 is (at least partially) governed by instructions or code of an application that are stored in a non-transitory computer readable storage medium of the apparatus and executed by the one or more processors of the apparatus. The application is associated with finding bugs in program code. Such an application can be stored in a memory of the apparatus (e.g., the non-transitory computer readable storage medium of the apparatus) and executed at a processor of the apparatus. As shown in FIG. 2A, the method 200 includes the following steps.

At S201, for each program code segment from the set of program code segments, the apparatus assigns a unique value to the detection variable of the state machine in a process of the respective program code segment operating the state machine. The unique value is identical to a value of an identification variable associated with the respective program code segment. Operations of S201 are similar to the operations of S101 shown and described above with respect to FIG. 1. Additionally, as show and described above with respect to FIG. 2B, the state machine operated by each program code segment from the set of program code segments is the same state machine, and the detection variable is the same variable. Furthermore, since each program code segment from the set of program code segments is different from each other (i.e., including different code), the values of the identification variables associated with those program code segments are different from each other. As a result, different values are assigned to the detection variable of the state machine corresponding to the set of program code segments.

Operations of S202-S204 are similar to the operations of S102 shown and described above with respect to FIG. 1. Specifically, at S202, the apparatus retrieves a core file generated in response to an abnormal program exit during a process of the set of program code segments operating the state machine. The core file is associated with (or contains information associated with) a program code segment from the set of program code segments, which is operating the state machine when the abnormal program exit occurs. Thus, the core file can be used to determine the suspicious program code segment. In some embodiments, each program code segment from the set of program code segments is potentially associated with the abnormal program exit. In other words, the abnormal program exit might occur during a process of any program code segment from the set of program code segments operating the state machine. For example, as shown in FIG. 2B, an abnormal program exit might occur when any of the program code segments 211, 221 or 231 operates the state machine 20. As a result, the apparatus retrieves a core file generated in response to the abnormal program exit. Such a core file contains information associated with the suspicious program code segment (i.e., the one that operates the state machine when the abnormal program exit occurs), which can be used to determine the suspicious program code segment.

At S203, the apparatus parses the core file to determine a context associated with the state machine when the abnormal program exit occurs. Such a context includes information associated with the suspicious program code segment, which can be used to determine the suspicious program code segment. At S204, the apparatus determines a current value of the detection variable based on the context. As describe above, although it is the same state machine being operated by each program code segment from the set of program code segments, the values assigned to the detection variable corresponding to each program code segment from the set of program code segments are different from each other. Thus, the current value of the detection variable is uniquely associated with a program code segment that operates the state machine when the abnormal program exit occurs.

At S205, the apparatus determines a suspicious program code segment from the set of program code segments based on a comparison of the current value of the detection variable with the unique values of the respective identification variables associated with the set of program code segments. Operations of S205 are similar to the operations of S103 shown and described above with respect to FIG. 1. At S206, the apparatus outputs debug information for the abnormal program exit, where the debug information includes information of at least one statement in the suspicious program code segment. Operations of S206 are similar to the operations of S104 shown and described above with respect to FIG. 1.

Figure 3:
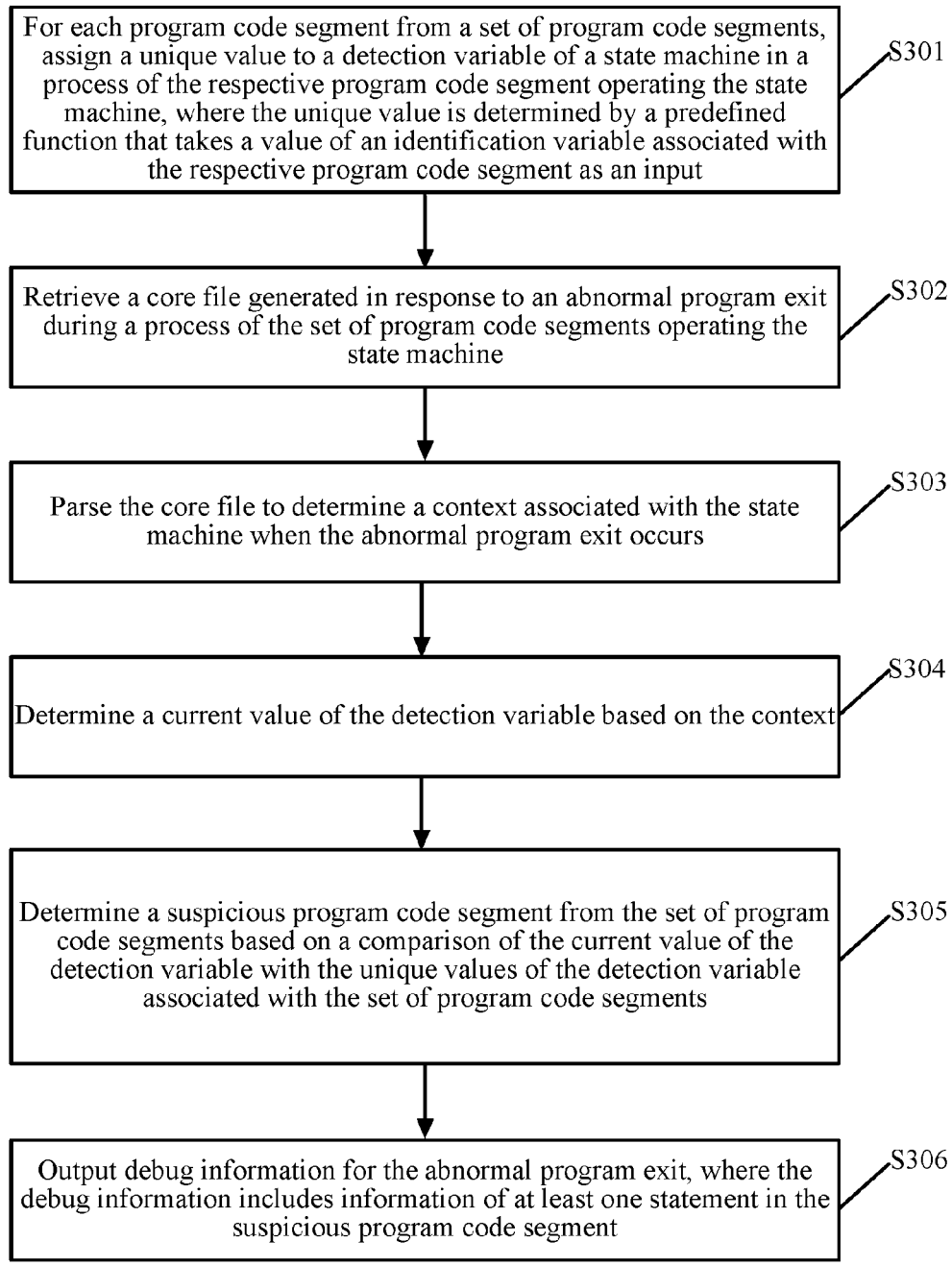
FIG. 3 is a flow chart illustrating another method performed at an apparatus for finding bugs in program code in accordance with some embodiments.

FIG. 3 is a flow chart illustrating another method 300 performed at an apparatus for finding bugs in program code in accordance with some embodiments. The apparatus performing the method 300 can be structurally and functionally similar to the apparatuses performing the methods 100, 200 described above with respect to FIGS. 1 and 2A. Particularly, the program code debugged by the apparatus includes a set of program code segments. The apparatus is configured to assign a unique value to a detection variable of a state machine while a respective program code segment from the set of program code segments is operating that state machine. Similar to the embodiments described with respect to FIGS. 2A and 2B, each program code segment from the set of program code segments is operating the same state machine. In such embodiments, a detection variable of that state machine is assigned different values by the apparatus when a respective program code segments is operating that state machine.

Similar to the apparatuses performing the methods 100 and 200, the apparatus performing the method 300 can include one or more processors and memory. In such embodiments, the method 300 is (at least partially) governed by instructions or code of an application that are stored in a non-transitory computer readable storage medium of the apparatus and executed by the one or more processors of the apparatus. The application is associated with finding bugs in program code. Such an application can be stored in a memory of the apparatus (e.g., the non-transitory computer readable storage medium of the apparatus) and executed at a processor of the apparatus. As shown in FIG. 3, the method 300 includes the following steps.

At S301, for each program code segment from the set of program code segments, the apparatus assigns a unique value to the detection variable of the state machine in a process of the respective program code segment operating the state machine. The unique value is determined by a predefined function that takes a value of an identification variable associated with the respective program code segment as an input. Operations of S301 are similar to the operations of S101 shown and described above with respect to FIG. 1. Additionally, as described above, the state machine operated by each program code segment from the set of program code segments is the same state machine, and the detection variable is the same variable. Furthermore, since each program code segment from the set of program code segments is different from each other (i.e., including different code), the values of the identification variables associated with those program code segments are different from each other. As a result, different values are assigned to the detection variable of the state machine corresponding to the set of program code segments.

Operations of S302-S304 are similar to the operations of S102 and S202-S204 shown and described above with respect to FIGS. 1 and 2A. Specifically, at S302, the apparatus retrieves a core file generated in response to an abnormal program exit during a process of the set of program code segments operating the state machine. The core file is associated with (or contains information associated with) a program code segment from the set of program code segments, which is operating the state machine when the abnormal program exit occurs. Thus, the core file can be used to determine the suspicious program code segment. In some embodiments, each program code segment from the set of program code segments is potentially associated with the abnormal program exit. In other words, the abnormal program exit might occur during a process of any program code segment from the set of program code segments operating the state machine.

At S303, the apparatus parses the core file to determine a context associated with the state machine when the abnormal program exit occurs. Such a context includes information associated with the suspicious program code segment, which can be used to determine the suspicious program code segment. At S304, the apparatus determines a current value of the detection variable based on the context. As describe above, although it is the same state machine being operated by each program code segment from the set of program code segments, the values assigned to the detection variable corresponding to each program code segment from the set of program code segments are different from each other. Thus, the current value of the detection variable is uniquely associated with a program code segment that operates the state machine when the abnormal program exit occurs.

At S305, the apparatus determines a suspicious program code segment from the set of program code segments based on a comparison of the current value of the detection variable with the unique values of the detection variable associated with the set of program code segments. Operations of S305 are similar to the operations of S103 shown and described above with respect to FIG. 1. At S306, the apparatus outputs debug information for the abnormal program exit, where the debug information includes information of at least one statement in the suspicious program code segment. Operations of S306 are similar to the operations of S104 shown and described above with respect to FIG. 1.

Figure 4:
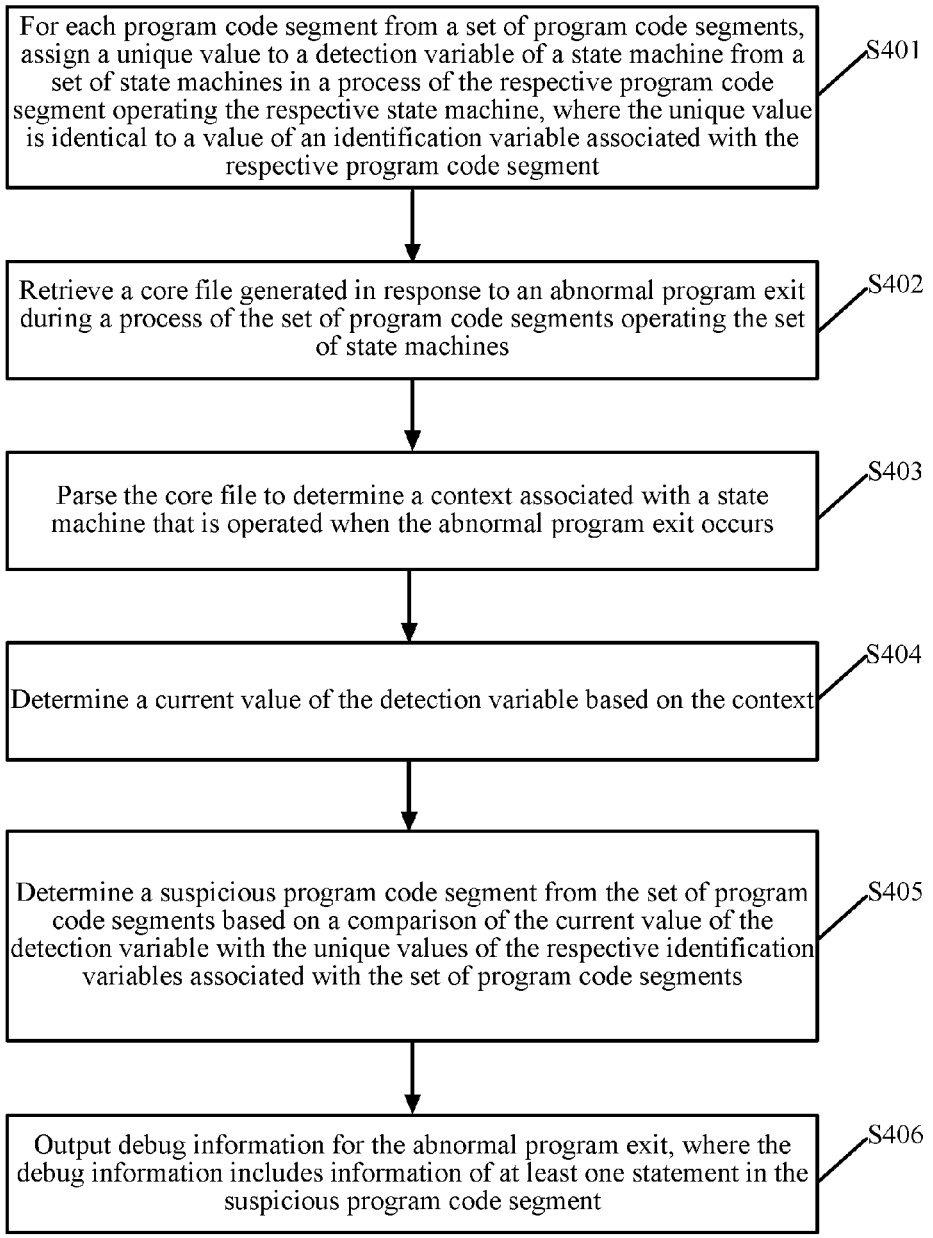
FIG. 4 is a flow chart illustrating another method performed at an apparatus for finding bugs in program code in accordance with some embodiments.

FIG. 4 is a flow chart illustrating another method 400 performed at an apparatus for finding bugs in program code in accordance with some embodiments. The apparatus performing the method 400 can be structurally and functionally similar to the apparatuses performing the methods 100-300 described above with respect to FIGS. 1-3. Particularly, the program code debugged by the apparatus includes a set of program code segments. The apparatus is configured to assign a unique value to a detection variable of a state machine while a respective program code segment from the set of program code segments is operating that state machine. Different from the embodiments described with respect to FIGS. 2A, 2B and 3, the set of program code segments operate a set of state machines including one or more state machines. In other words, different program code segments from the set of program code segments can operate the same or different state machines. In such embodiments, a detection variable of a respective state machine is assigned different values by the apparatus when a respective program code segments is operating that state machine.

Similar to the apparatuses performing the methods 100-300, the apparatus performing the method 400 can include one or more processors and memory. In such embodiments, the method 400 is (at least partially) governed by instructions or code of an application that are stored in a non-transitory computer readable storage medium of the apparatus and executed by the one or more processors of the apparatus. The application is associated with finding bugs in program code. Such an application can be stored in a memory of the apparatus (e.g., the non-transitory computer readable storage medium of the apparatus) and executed at a processor of the apparatus. As shown in FIG. 4, the method 400 includes the following steps.

At S401, for each program code segment from the set of program code segments, the apparatus assigns a unique value to a detection variable of a state machine from the set of state machines in a process of the respective program code segment operating the respective state machine. The unique value is identical to a value of an identification variable associated with the respective program code segment. Operations of S401 are similar to the operations of S101 shown and described above with respect to FIG. 1. Additionally, as described above, the state machine(s) operated by the set of program code segments can be the same state machine or different state machines, and the detection variable(s) can be the same variable or different variables. Furthermore, since each program code segment from the set of program code segments is different from each other (i.e., including different code), the values of the identification variables associated with those program code segments are different from each other. As a result, different values are assigned to the detection variable(s) of the state machine(s) corresponding to the set of program code segments.

Operations of S402-S404 are similar to the operations of S102, S202-S204 and S302-S304 shown and described above with respect to FIGS. 1-3. Specifically, at S402, the apparatus retrieves a core file generated in response to an abnormal program exit during a process of the set of program code segments operating the set of state machines. The core file is associated with (or contains information associated with) a program code segment from the set of program code segments, which is operating a respective state machine from the set of state machines when the abnormal program exit occurs. Thus, the core file can be used to determine the suspicious program code segment. In some embodiments, each program code segment from the set of program code segments is potentially associated with the abnormal program exit. In other words, the abnormal program exit might occur during a process of any program code segment from the set of program code segments operating a respective state machine.

At S403, the apparatus parses the core file to determine a context associated with a respective state machine when the abnormal program exit occurs. Such a context includes information associated with the suspicious program code segment, which can be used to determine the suspicious program code segment. At S404, the apparatus determines a current value of the detection variable based on the context. As describe above, regardless of the same state machine or different state machines being operated by the set of program code segments, the values assigned to a respective detection variable corresponding to each program code segment from the set of program code segments are different from each other. Thus, the current value of the detection variable is uniquely associated with a program code segment that operates a respective state machine when the abnormal program exit occurs.

At S405, the apparatus determines a suspicious program code segment from the set of program code segments based on a comparison of the current value of the detection variable with the unique values of the identification variables associated with the set of program code segments. Operations of S405 are similar to the operations of S103 shown and described above with respect to FIG. 1. At S406, the apparatus outputs debug information for the abnormal program exit, where the debug information includes information of at least one statement in the suspicious program code segment. Operations of S406 are similar to the operations of S104 shown and described above with respect to FIG. 1.

Figure 5:
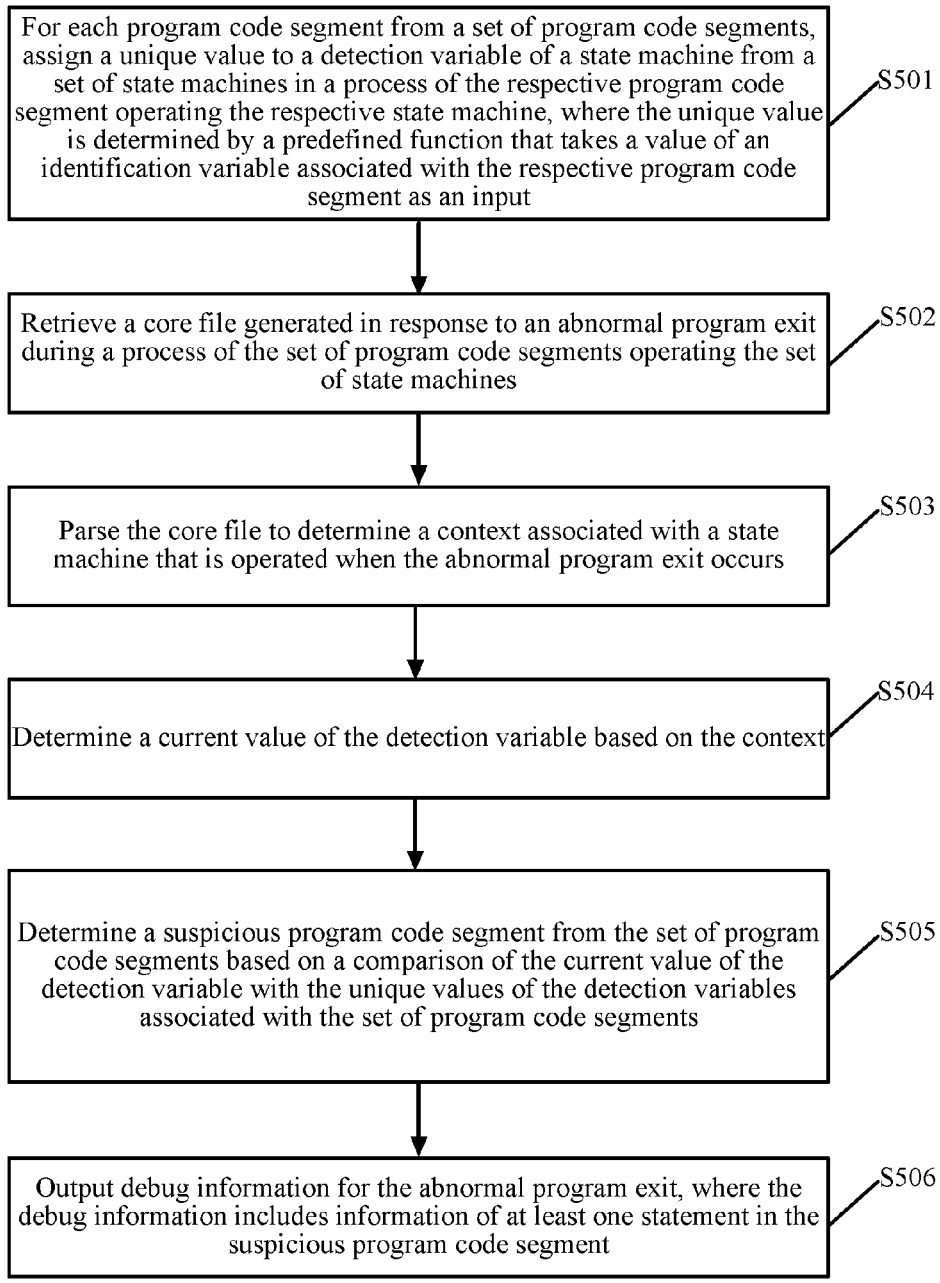
FIG. 5 is a flow chart illustrating another method performed at an apparatus for finding bugs in program code in accordance with some embodiments.

FIG. 5 is a flow chart illustrating another method performed at an apparatus for finding bugs in program code in accordance with some embodiments. The apparatus performing the method 500 can be structurally and functionally similar to the apparatuses performing the methods 100-400 described above with respect to FIGS. 1-4. Particularly, the program code debugged by the apparatus includes a set of program code segments. The apparatus is configured to assign a unique value to a detection variable of a state machine while a respective program code segment from the set of program code segments is operating that state machine. Similar to the embodiments described with respect to FIG. 4, the set of program code segments operate a set of state machines including one or more state machines. In other words, different program code segments from the set of program code segments can operate the same or different state machines. In such embodiments, a detection variable of a respective state machine is assigned different values by the apparatus when a respective program code segments is operating that state machine.

Similar to the apparatuses performing the methods 100-400, the apparatus performing the method 500 can include one or more processors and memory. In such embodiments, the method 500 is (at least partially) governed by instructions or code of an application that are stored in a non-transitory computer readable storage medium of the apparatus and executed by the one or more processors of the apparatus. The application is associated with finding bugs in program code. Such an application can be stored in a memory of the apparatus (e.g., the non-transitory computer readable storage medium of the apparatus) and executed at a processor of the apparatus. As shown in FIG. 5, the method 500 includes the following steps.

At S501, for each program code segment from the set of program code segments, the apparatus assigns a unique value to a detection variable of a state machine from the set of state machines in a process of the respective program code segment operating the respective state machine. The unique value is determined by a predefined function that takes a value of an identification variable associated with the respective program code segment as an input. Operations of S501 are similar to the operations of S101 shown and described above with respect to FIG. 1. Additionally, as described above, the state machine(s) operated by the set of program code segments can be the same state machine or different state machines, and the detection variable(s) can be the same variable or different variables. Furthermore, since each program code segment from the set of program code segments is different from each other (i.e., including different code), the values of the identification variables associated with those program code segments are different from each other. As a result, different values are assigned to the detection variable(s) of the state machine(s) corresponding to the set of program code segments.

Operations of S502-S504 are similar to the operations of S102, S202-S204, S302-S304 and S402-S404 shown and described above with respect to FIGS. 1-4. Specifically, at S502, the apparatus retrieves a core file generated in response to an abnormal program exit during a process of the set of program code segments operating the set of state machines. The core file is associated with (or contains information associated with) a program code segment from the set of program code segments, which is operating a respective state machine from the set of state machines when the abnormal program exit occurs. Thus, the core file can be used to determine the suspicious program code segment. In some embodiments, each program code segment from the set of program code segments is potentially associated with the abnormal program exit. In other words, the abnormal program exit might occur during a process of any program code segment from the set of program code segments operating a respective state machine.

At S503, the apparatus parses the core file to determine a context associated with a respective state machine when the abnormal program exit occurs. Such a context includes information associated with the suspicious program code segment, which can be used to determine the suspicious program code segment. At S504, the apparatus determines a current value of the detection variable based on the context. As describe above, regardless of the same state machine or different state machines being operated by the set of program code segments, the values assigned to a respective detection variable corresponding to each program code segment from the set of program code segments are different from each other. Thus, the current value of the detection variable is uniquely associated with a program code segment that operates a respective state machine when the abnormal program exit occurs.

At S505, the apparatus determines a suspicious program code segment from the set of program code segments based on a comparison of the current value of the detection variable with the unique values of the detection variables associated with the set of program code segments. Operations of S505 are similar to the operations of S103 shown and described above with respect to FIG. 1. At S506, the apparatus outputs debug information for the abnormal program exit, where the debug information includes information of at least one statement in the suspicious program code segment. Operations of S506 are similar to the operations of S104 shown and described above with respect to FIG. 1.

Figure 6A:
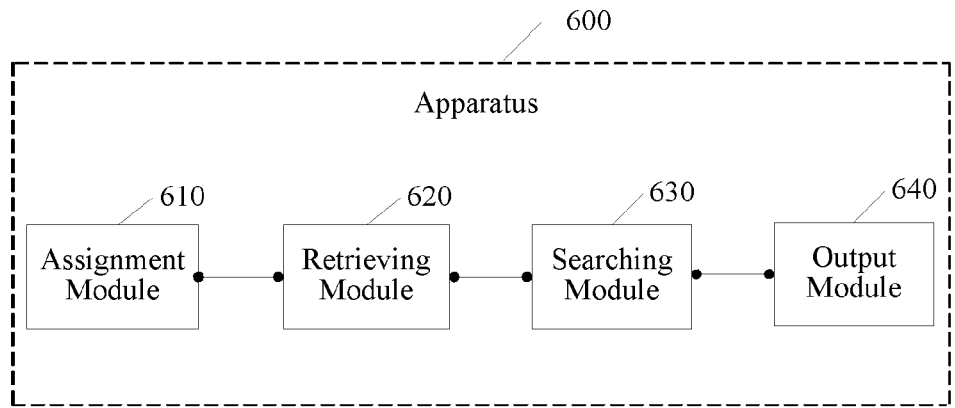
FIG. 6A is a block diagram illustrating modules of an apparatus for finding bugs in program code in accordance with some embodiments.

FIG. 6A is a block diagram illustrating modules of an apparatus 600 for finding bugs in program code in accordance with some embodiments. The apparatus 600 can be structurally and functionally similar to the apparatuses described with respect to FIGS. 1-5. As shown in FIG. 6A, the apparatus 600 includes an assignment module 610, a retrieving module 620, a searching module 630 and an output module 640. In some embodiments, the apparatus 600 can include more or less modules than those shown in FIG. 6A.

In some embodiments, each module included in the apparatus 600 can be a hardware-based module (e.g., a digital signal processor (DSP), an application-specific integrated circuit (ASIC), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the apparatus 600 (not shown in FIG. 6A) and executed at a processor (e.g., a CPU) of the apparatus 600 (not shown in FIG. 6A). Overall, the assignment module 610, the retrieving module 620, the searching module 630 and the output module 640 can be configured to collectively perform the methods 100-500 shown and described with respect to FIGS. 1-5.

Specifically, the assignment module 610 is configured to, among other functions, for each program code segment from a set of program code segments, assign a unique value to a detection variable of a state machine in a process of the respective program code segment operating the state machine. Similarly stated, the assignment module 610 is configured to perform S101 of the method 100 described with respect to FIG. 1. The unique value is based on a value of an identification variable associated with the respective program code segment. In some embodiments, as shown and described with respect to FIGS. 2A and 4, the assignment module 610 is configured to assign a value of an identification variable associated with a respective program code segment, as the unique value, to the detection variable of a respective state machine.

In some other embodiments, as shown and described with respect to FIGS. 3 and 5, the assignment module 610 is configured to assign a value calculated based on the value of the identification variable associated with the respective program code segment, as the unique value, to the detection variable of the respective state machine. In such embodiments, for example, the unique value assigned to the detection variable can be determined by a predefined function that takes the value of the identification variable associated with the respective program code segment as an input. Furthermore, the predefined function can be any mathematical and/or logical function where the value of the identification variable can be uniquely determined from the result of the function by a reverse calculation.

The retrieving module 620 is configured to, among other functions, determine a current value of the detection variable corresponding to an abnormal program exit during a process of the set of program code segments operating at least one state machine. Similarly stated, the retrieving module 620 is configured to perform S102 of the method 100 described with respect to FIG. 1. In some embodiments, to determine the current value of the detection variable, the retrieving module 620 is configured to retrieve a context associated with a state machine when the abnormal program exit occurs, and then determine the current value of the detection variable based on the retrieved context.

In some embodiments, to determine a current value of the detection variable corresponding to an abnormal program exit, the retrieving module 620 is configured to retrieve a core file generated in response to the abnormal program exit. The retrieving module 620 is also configured to parse the core file to determine a context associated with the respective state machine when the abnormal program exit occurs. The retrieving module 620 is further configured to determine the current value of the detection variable based on the context.

The searching module 630 is configured to, among other functions, determine a suspicious program code segment from the set of program code segments based on a comparison of the current value of the detection variable with the unique values of the respective identification variables associated with the set of program code segments. Similarly stated, the searching module 630 is configured to perform S103 of the method 100 described with respect to FIG. 1. Specifically, by comparing the current value of the detection variable with the values of the respective identification variables associated with the set of program code segments, the searching module 630 is can determine that the current value of the detection variable was identical to the value of the identification variable associated with the suspicious program code segment, or the current value of the detection variable was calculated using the predefined function that takes the value of the identification variable associated with the suspicious program code segment as an input.

The output module 640 is configured to, among other functions, output debug information for the abnormal program exit, where the debug information includes information of at least one statement in the suspicious program code segment. Similarly stated, the output module 640 is configured to perform S104 of the method 100 described with respect to FIG. 1. In some embodiments, the debug information includes location information of an assignment statement for the detection variable or other statement in the suspicious program code segment. In some embodiments, the location information includes, for example, a line number associated with the assignment statement or another statement included in the suspicious program code segment, a name of a function that includes the assignment statement or another statement included in the suspicious program code segment, a file name of a source file that includes the assignment statement or another statement included in the suspicious program code segment, and/or the like. In some embodiments, the location information can include any other information useful for locating the potential bug in the program code.

Figure 6B:
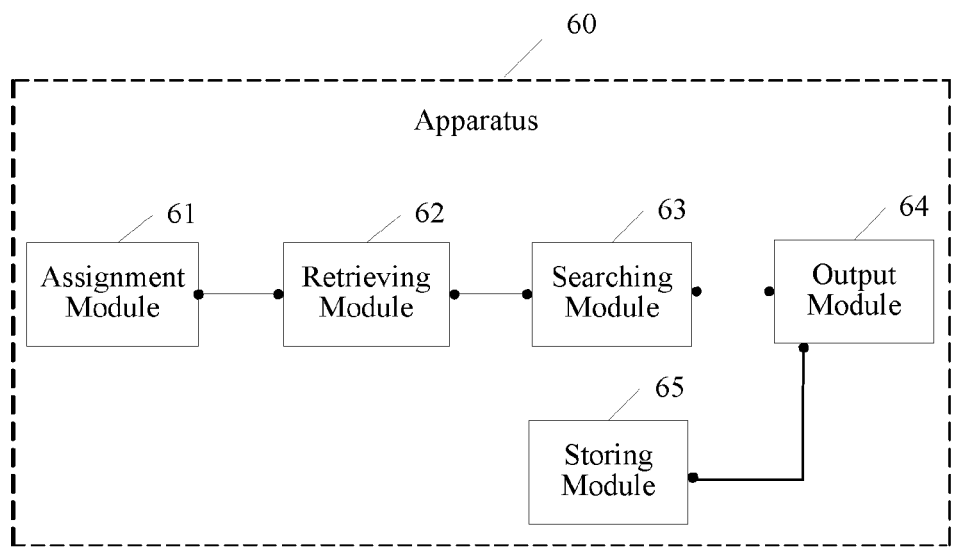
FIG. 6B is a block diagrams illustrating modules of another apparatus for finding bugs in program code in accordance with some embodiments.

FIG. 6B is a block diagrams illustrating modules of another apparatus 60 for finding bugs in program code in accordance with some embodiments. The apparatus 60 can be structurally and functionally similar to the apparatuses described with respect to FIGS. 1-5. Particularly, the apparatus 60 can be similar to the apparatus 600 shown and described above with respect to FIG. 6A. As shown in FIG. 6B, the apparatus 60 includes an assignment module 61, a retrieving module 62, a searching module 63, an output module 64 and a storing module 65. In some embodiments, the apparatus 60 can include more or less modules than those shown in FIG. 6B.

In some embodiments, each module included in the apparatus 60 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each module can be stored in a memory of the apparatus 60 (not shown in FIG. 6B) and executed at a processor (e.g., a CPU) of the apparatus 60 (not shown in FIG. 6B). Overall, the assignment module 61, the retrieving module 62, the searching module 63, the output module 64 and the storing module 65 can be configured to collectively perform the methods 100-500 shown and described with respect to FIGS. 1-5.

Specifically, similar to the assignment module 610 of the apparatus 600 in FIG. 6A, the assignment module 61 is configured to, for each program code segment from a set of program code segments, assign a unique value to a detection variable of a state machine in a process of the respective program code segment operating the state machine. Similar to the retrieving module 620 of the apparatus 600 in FIG. 6A, the retrieving module 62 is configured to determine a current value of the detection variable corresponding to an abnormal program exit during a process of the set of program code segments operating at least one state machine. Similar to the searching module 630 of the apparatus 600 in FIG. 6A, the searching module 63 is configured to determine a suspicious program code segment from the set of program code segments based on a comparison of the current value of the detection variable with the unique values of the respective identification variables associated with the set of program code segments. Similar to the output module 640 of the apparatus 600 in FIG. 6A, the output module 64 is configured to output debug information for the abnormal program exit, where the debug information includes information of at least one statement in the suspicious program code segment.

Furthermore, the storing module 65 is configured to, among other functions, store the current value of the detection variable and the debug information in a data structure such as, for example, a list. Such a list can use a variable name of the detection variable as a key. In such embodiments, the apparatus 60 can efficiently and quickly retrieve the stored current value of the detection variable and/or the debug information from the data structure by using the variable name of the detection variable as a search key.

Figure 7:
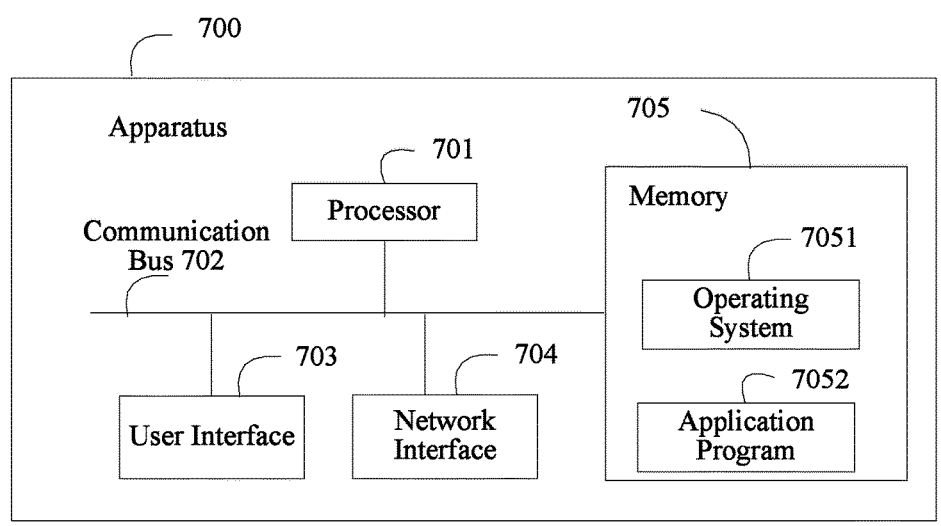
FIG. 7 is a block diagram illustrating components of an apparatus for finding bugs in program code in accordance with some embodiments.

FIG. 7 is a block diagram illustrating components of an apparatus 700 for finding bugs in program code in accordance with some embodiments. The apparatus 700 can be structurally and functionally similar to the apparatuses shown and/or described above with respect to FIGS. 1-6B. As shown in FIG. 7, the apparatus 700 includes a processor 701, a communication bus 702, a user interface 703, a network interface 704, and a memory 705. In some embodiments, an apparatus can include more or less devices, components and/or modules than those shown in FIG. 7.

The processor 701 can be any processing device capable of performing the methods 100-500 described with respect to FIGS. 1-5. Such a processor can be, for example, a CPU, a DSP, a FPGA, and/or the like. The processor 701 can be configured to control the operations of other components and/or modules of the apparatus 700. For example, the processor 701 can be configured to control operations of the network interface 704 and the user interface 703. For another example, the processor 701 can be configured to execute instructions or code stored in a software program or module within the memory 705.

The communication bus 702 is configured to implement connections and communication among the other components of the apparatus 700. The user interface 703 is configured to interact with users operating the apparatus 700 by using various input/output means. In some embodiments, operations of the user interface 703 (e.g., a display screen, a keyboard) are controlled by instructions or code stored in, for example, a user interface module (not shown in FIG. 7) within the memory 705.

The network interface 704 is configured to provide and control network interfaces of the apparatus 700 that are used to interact with other devices (e.g., a computing executing a program code). The network interface 704 can include, for example, a standard wired interface and/or a standard wireless interface (e.g., a Wi-Fi interface). In some embodiments, operations of the network interface 704 are controlled by instructions or code stored in, for example, a network communications module (not shown in FIG. 7) within the memory 705.

In some embodiments, the memory 705 can include, for example, a random-access memory (RAM) (e.g., a DRAM, a SRAM, a DDR RAM, etc.), a non-volatile memory such as one or more magnetic disk storage devices, optical disk storage devices, flash memory devices, or other non-volatile solid state storage devices. In some embodiments, the memory 705 can include one or more storage devices (e.g., a removable memory) remotely located from other components of the apparatus 700.

As shown in FIG. 7, the memory 705 includes at least an operating system 7051 and an application program 7052. The application program 7052 can be associated with performing the methods 100-500 for debugging a program code. In some embodiments, each component, program, application or module included in the memory 705 can be a hardware-based module (e.g., a DSP, a FPGA), a software-based module (e.g., a module of computer code executed at a processor, a set of processor-readable instructions executed at a processor), or a combination of hardware and software modules. Instructions or code of each component, program, application or module can be stored in the memory 705 and executed at the processor 701. Particularly, instructions or code of the methods 100-500 shown and described above with respect to FIGS. 1-5 can be stored in the application program 7052 within the memory 705. In some embodiments, the processor 701 is configured to perform the instructions or code stored in the application program 7052 within the memory 705, as shown and described above with respect to the methods 100-500 in FIGS. 1-5.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Terms "first," "second," "third," "fourth," and the like (if any) in the specifications and claims and the foregoing accompanying drawings of the present application are used for distinguishing similar objects, and need not be used for describing a specific sequence or precedence order. It should be understood that data used in this case may be exchanged in a proper situation, so that the embodiments of the present application described herein can be performed in a sequence besides, for example, sequences shown or described herein. In addition, terms "include" and "have" and any forms thereof are intend to cover non-exclusive including, for example, including a process, a method, a system, a product or a device of a series of steps or units, but not limited to the steps or units that are clearly listed, and may include other steps or units which are inherent in the process, method, product or device or which is not clearly listed.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of finding bugs in program code, comprising:
    at an apparatus having one or more processors and memory for storing programs to be executed by the one or more processors:
    for each respective program code segment from a plurality of program code segments, assigning a unique value to a detection variable of a state machine in a process of the respective program code segment operating the state machine, the unique value being based on a value of an identification variable associated with the respective program code segment;
    determining a current value of the detection variable corresponding to an abnormal program exit during a process of the plurality of program code segments operating at least one state machine, wherein the determining the current value of the detection variable includes:
    retrieving a context associated with the at least one state machine when the abnormal program exit occurs, wherein the retrieving the context includes:
    retrieving a core file generated in response to the abnormal program exit; and
    parsing the core file to determine the context associated with the at least one state machine when the abnormal program exit occurs; and
    determining the current value of the detection variable based on the retrieved context;
    determining a suspicious program code segment from the plurality of program code segments that has contributed to the abnormal program exit, wherein the determining includes:
    comparing the current value of the detection variable with the unique values that are based on the respective identification variables associated with the plurality of program code segments; and
    identifying a first program code segment as the suspicious program code segment based on a comparison of the current value of the detection variable and the unique value that is based on the identification variable associated with the first program code segment; and
    outputting debug information for the abnormal program exit, the debug information including information of at least one statement in the suspicious program code segment.

2. The method of claim 1, wherein, for each program code segment from the plurality of program code segments, the value of the identification variable associated with the respective program code segment is a current value of the identification variable determined in the process of the respective program code segment operating the state machine.

3. The method of claim 1, wherein, for each program code segment from the plurality of program code segments, the unique value assigned to the detection variable of the state machine in the process of the respective program code segment operating the state machine is identical to the value of the identification variable associated with the respective program code segment.

4. The method of claim 1, wherein, for each program code segment from a plurality of program code segments, the unique value assigned to the detection variable of the state machine in the process of the respective program code segment operating the state machine is determined by a predefined function that takes the value of the identification variable associated with the respective program code segment as an input.

5. The method of claim 1, further comprising: wherein the determining the suspicious program code segment includes determining the suspicious program code segment based on a determination that the current value of the detection variable was assigned to the detection variable based on the value of the identification variable associated with the first program code segment.

6. The method of claim 1, wherein, for each program code segment from the plurality of program code segments, the assigning a unique value to the detection variable includes assigning the unique value to the detection variable using an assignment statement for the detection variable in the respective program code segment.

7. The method of claim 1, further comprising:
    storing the current value of the detection variable and the debug information in a list, the list using a variable name of the detection variable as a key.

8. The method of claim 1, further comprising:
    storing a plurality of values of identification variables, each value from the plurality of values being associated with a respective program code segment from the plurality of program code segments.

9. The method of claim 1, wherein the debug information includes location information of an assignment statement for the detection variable in the suspicious program code segment.

10. The method of claim 9, wherein the location information includes at least one of a line number associated with the assignment statement, a name of a function that includes the assignment statement, and a file name of a source file that includes the assignment statement.

11. An apparatus, comprising:
    one or more central processing units (CPUs); and
    memory storing one or more programs to be executed by the one or more CPUs, the one or more programs comprising instructions for:
    for each respective program code segment from a plurality of program code segments, assigning a unique value to a detection variable of a state machine in a process of the respective program code segment operating the state machine, the unique value being based on a value of an identification variable associated with the respective program code segment;

determining a current value of the detection variable corresponding to an abnormal program exit during a process of the plurality of program code segments operating at least one state machine, wherein the determining the current value of the detection variable includes:

retrieving a context associated with the at least one state machine when the abnormal program exit occurs, wherein the retrieving the context includes:

retrieving a core file generated in response to the abnormal program exit; and parsing the core file to determine the context associated with the at least one state machine when the abnormal program exit occurs; and determining the current value of the detection variable based on the retrieved context;

determining a suspicious program code segment from the plurality of program code segments that has contributed to the abnormal program exit, wherein the determining includes:

comparing the current value of the detection variable with the unique values that are based on the respective identification variables associated with the plurality of program code segments; and identifying a first program code segment as the suspicious program code segment based on a comparison of the current value of the detection variable and the unique value that is based on the identification variable associated with the first program code segment; and outputting debug information for the abnormal program exit, the debug information including information of at least one statement in the suspicious program code segment.

12. The apparatus of claim 11, wherein, for each program code segment from the plurality of program code segments, the unique value assigned to the detection variable of the state machine in the process of the respective program code segment operating the state machine is identical to the value of the identification variable associated with the respective program code segment, or determined by a predefined function that takes the value of the identification variable associated with the respective program code segment as an input.

13. A non-transitory computer readable storage medium storing one or more programs, the one or more programs comprising instructions, which, when executed by one or more processors, cause the processors to perform operations comprising:

at an apparatus:
for each respective program code segment from a plurality of program code segments, assigning a unique value to a detection variable of a state machine in a process of the respective program code segment operating the state machine, the unique value being based on a value of an identification variable associated with the respective program code segment;

determining a current value of the detection variable corresponding to an abnormal program exit during a process of the plurality of program code segments operating at least one state machine, wherein the determining the current value of the detection variable includes:

retrieving a context associated with the at least one state machine when the abnormal program exit occurs, wherein the retrieving the context includes:

retrieving a core file generated in response to the abnormal program exit; and parsing the core file to determine the context associated with the at least one state machine when the abnormal program exit occurs; and determining the current value of the detection variable based on the retrieved context;

determining a suspicious program code segment from the plurality of program code segments that has contributed to the abnormal program exit, wherein the determining includes:

comparing the current value of the detection variable with the unique values that are based on the respective identification variables associated with the plurality of program code segments; and identifying a first program code segment as the suspicious program code segment based on a comparison of the current value of the detection variable and the unique value that is based on the identification variable associated with the first program code segment; and outputting debug information for the abnormal program exit, the debug information including information of at least one statement in the suspicious program code segment.

14. The non-transitory computer readable storage medium of claim 13, wherein the determining the suspicious program code segment includes determining the suspicious program code segment based on a determination that the current value of the detection variable was assigned to the detection variable based on the value of the identification variable associated with the first program code segment.

15. The non-transitory computer readable storage medium of claim 13, wherein the debug information includes location information of an assignment statement for the detection variable in the suspicious program code segment.

16. The non-transitory computer readable storage medium of claim 15, wherein the location information includes at least one of a line number associated with the assignment statement, a name of a function that includes the assignment statement, and a file name of a source file that includes the assignment statement.

* * * * *